Patented Nov. 28, 1950

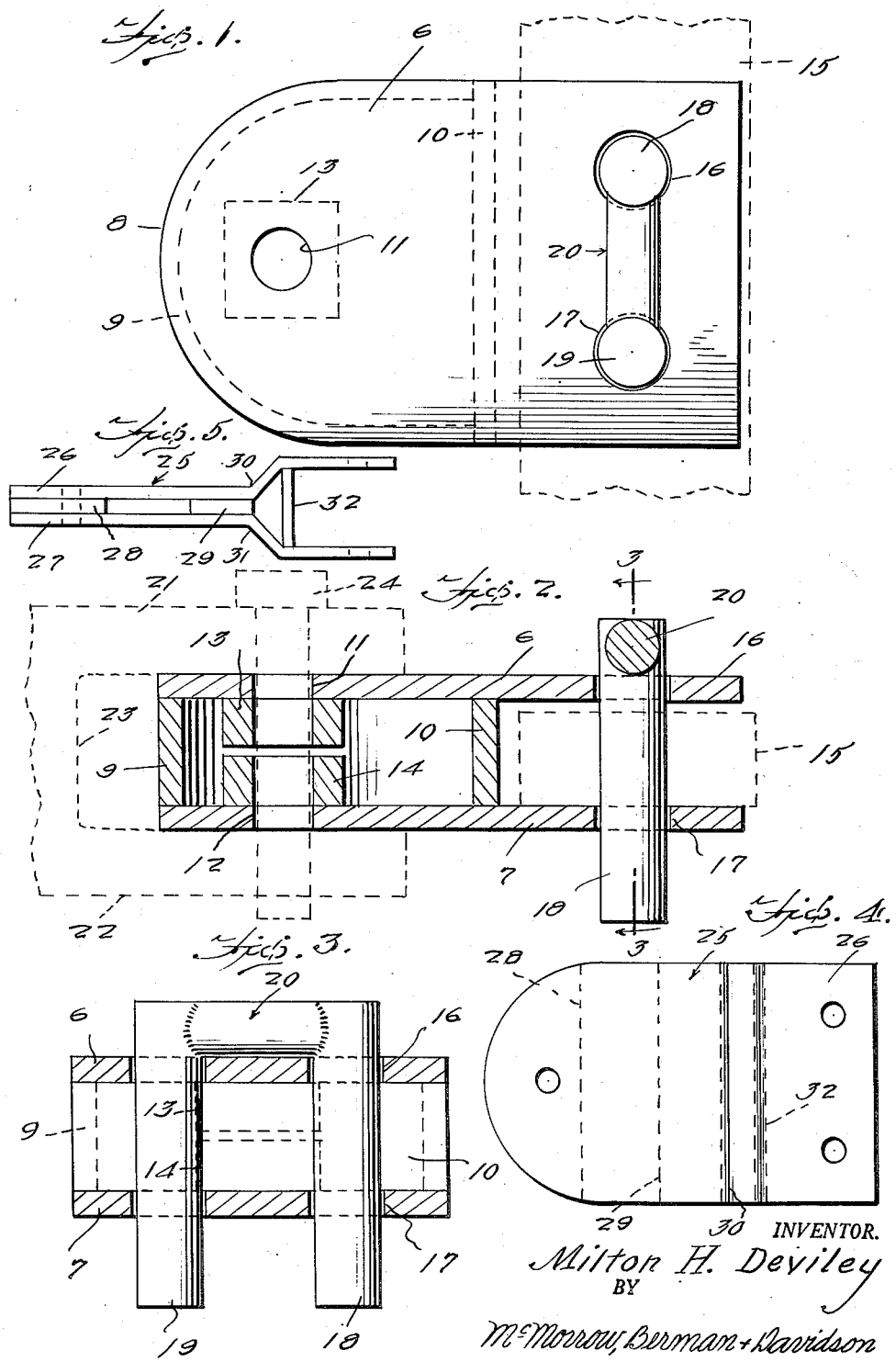

2,531,559

UNITED STATES PATENT OFFICE 2,531,559

HITCH

Milton H. Deviley, Oneida, Wis.

Application November 14, 1947, Serial No. 785,999

2 Claims. (Cl. 280—33.15)

This invention relates to a hitch for connecting an implement or vehicle to a tractor.

An object of the invention is to provide a hitch or coupling device of this kind adapted to be removably attached to the drawbar of a tractor and the pole or tongue of an implement or vehicle drawn by the tractor.

Another object is to provide such a device which eliminates binding and frictional contact between the pole of an implement and the drawbar of a tractor, and the damage resulting from such binding and contact.

Another object of the invention is to provide a hitch of the kind described which may be quickly removed from one position on a drawbar to another.

A further object of the invention is to provide a hitch of simple, light construction, and adapted for low cost production and long usage.

These and other objects are attained by the present invention as hereinafter described and as disclosed in the accompanying drawing, in which:

Figure 1 is a top plan of a hitch of the present invention connected with a drawbar of which only the cooperating adjacent portions are shown.

Figure 2 is a longitudinal cross-sectional view of my invention showing, in dotted lines at the right side of the view, the outline of a positioned drawbar, and at the left side, the projecting end straps of an implement pole or tongue, coupled by a drawpin to the hitch of my invention.

Figure 3 is a cross-sectional view on the line 3—3 of Figure 2.

Figure 4 is a top plan view of a modified hitch of my invention.

Figure 5 is a side view of the same.

The connection between a tractor and a device drawn thereby, such as an agricultural implement or vehicle, is usually at the present time, effected by simply coupling the end straps provided on an implement pole, to the drawbar of the vehicle. Upon swivelling of these connected parts, when turns are made, the end of the pole becomes angularly disposed relative to the drawbar and binds, or at least bears with considerable force thereagainst, whereby it frequently happens not only that undesirable wear and tear to all these associated parts occur, but actual breaking and distortion thereof. There has been some attempt to solve this problem by providing swinging drawbars but these are costly, heavy and unwieldy. They are difficult to remove and position and this must be done each time the drawbar is removed and replaced, an operation necessary whenever a hydraulically-lifted implement is attached to the tractor. In this connection, in addition to the other advantages provided by my invention, it may be noted that it may be left in position on the drawbar when the latter is removed, thus obviating considerable labor.

With reference to the drawing, the device of my invention, as seen in Figures 1, 2, and 3, may be efficiently and conveniently constructed by the use of upper and lower metal plates, 6 and 7, respectively, having rounded forward portions as seen at 8. The two plates are spaced apart by an arcuate spacer 9 positioned between the forward portions of the plates 6 and 7, and by a transverse spacer 10 positioned substantially midway of the length of the plates. All the parts mentioned are welded together to form a strong unitary or one-piece construction.

In the forward portions, plates 6 and 7 are formed with registering openings 11 and 12, which may be strengthened by the use of apertured lugs 13 and 14 surrounding said openings and welded to the inner faces of the plates 6 and 7, respectively.

It will be seen that formation of my hitch as just described, results in an open or slotted rear portion wherein the spaced plates 6 and 7 are adapted to embrace or receive the drawbar 15 of a tractor or other element to which it is desired to attach the hitch. Plates 6 and 7, adjacent the rear, are provided with a pair of laterally-spaced openings 16 and 17, disposed in registration and adapted to receive the legs 18 and 19 of a U-shaped coupling pin or staple 20, provided in accordance with my invention.

The openings 16 and 17 are spaced laterally a distance similar to the spacing of the apertures normally provided along the length of a drawbar. It will be obvious that my device may be moved to altered positions along the drawbar and the coupling device 20 inserted through plates 6 and 7 and the adjacent apertures in the embraced part of the drawbar.

The forward portion of my hitch is adapted to be inserted between the projecting straps 21 and 22 (Figure 2) of an implement or vehicle pole 23. The straps are formed with registering apertures to receive a drawpin 24 which passes also through openings 11 and 12 of the plates 6 and 7 whereby a swivel connection is effected.

A modified form of hitch 25 is seen in Figures 4 and 5, wherein the plates 26 and 27 in their forward portions, are more closely spaced by suitable spacers 28 and 29, and the rear parts of the plates are formed divergently, as at 30 and 31, to effect the bifurcated construction shown, adapted to receive drawbars of greater than normal thickness. A rear spacer 32 is preferably provided in this form of the invention. The use of the device is identical with that of the first form of the invention.

The hitch effectively spaces the pole 23 from the drawbar 15 precluding all possible contact therebetween. Furthermore, contact, binding and abrasion between the pole 23 and the hitch is obviated by the rebounded forward portion 8 of the hitch.

Modifications will suggest themselves upon consideration of the means herein disclosed but these are believed to be comprised within the spirit and scope of my invention.

What is claimed is:

1. The combination with an implement or vehicle pole provided with a pair of spaced projecting straps having aligned openings to receive a drawpin, of a hitch for connecting the pole with a tractor provided with a drawbar having a pair of openings therein, said hitch comprising a unitary device formed with a rounded forward portion for insertion between said straps and provided with an opening to receive the drawpin, a bifurcated portion for receiving the drawbar and formed with a pair of openings in transverse alignment and spaced similarly to the openings of the drawbar for registration therewith, and a U-shaped securing member adapted for insertion into the aligned openings of said rear portion and drawbar for removably securing said parts together.

2. A hitch for connecting a tractor drawbar and the tongue of an implement tongue having a pair of spaced elements provided with aligned openings to receive a drawpin, said hitch comprising a unitary device including spaced opposed plates having a pair of their opposed ends rounded and provided near such rounded ends with aligned openings, a curved spacer plate secured between the opposed plates adjacent to the rounded ends and substantially conforming to the curvature of such ends, a transverse spacer plate secured between the opposed plates near the longitudinal centers of the opposed plates, opposed lugs mounted upon the inner faces of the opposed plates adjacent to the aligned openings and having openings which register with the aligned openings and having their inner faces arranged in close spaced relation, the opposed plates extending longitudinally outwardly beyond the transverse spacer plate to form a main opening for receiving the drawbar, the opposed plates being provided adjacent to the main opening with transversely spaced pairs of aligned openings to register with openings in the drawbar, and a U-shaped member for insertion through the pairs of aligned openings for detachably connecting the hitch and drawbar, the rounded ends of the opposed plates extending between the spaced elements of the tongue, the aligned openings near the rounded ends registering with the aligned openings of the spaced elements and receiving the drawpin therethrough.

MILTON H. DEVILEY.

REFERENCES CITED

The following references are of record in the file of this patent:

UNITED STATES PATENTS

| Number | Name | Date |
|---|---|---|
| 2,180,621 | Thomason et al. | Nov. 21, 1939 |